(12) United States Patent
Hironishi et al.

(10) Patent No.: US 7,706,695 B2
(45) Date of Patent: Apr. 27, 2010

(54) OPTICAL DQPSK RECEIVER APPARATUS

(75) Inventors: Kazuo Hironishi, Kawasaki (JP);
Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 946 days.

(21) Appl. No.: 11/476,028

(22) Filed: Jun. 28, 2006

(65) Prior Publication Data
US 2007/0230625 A1    Oct. 4, 2007

(30) Foreign Application Priority Data
Mar. 30, 2006    (JP) .............................. 2006-096014

(51) Int. Cl.
*H04B 10/04* (2006.01)
*H04B 10/06* (2006.01)

(52) U.S. Cl. .................... 398/188; 398/212; 398/214

(58) Field of Classification Search ................ 398/188, 398/183, 192, 200, 201, 202, 212, 214; 359/279
See application file for complete search history.

(56) References Cited

U.S. PATENT DOCUMENTS 5,970,185 A * 10/1999 Baker et al. ..................... 385/3
2004/0081470 A1   4/2004 Griffin 2007/0223938 A1 * 9/2007 Gervais et al. ............... 398/188

FOREIGN PATENT DOCUMENTS

| DE | 10 2004 021 816 A1 | 11/2005 |
| JP | A-2004-516743 | 6/2004 |
| WO | WO 03/063515 A2 | 7/2003 |
| WO | WO 2005/107107 A2 * | 11/2005 |

OTHER PUBLICATIONS

Michael Ohm and Joachim Speidel, *Differential Optical 8-PSK With Direct Detection (8-DPSK/DD)*, XP009058373, pp. 1-6.
Extended European search report, Jul. 24, 2007, Application No. 06013359.2-2415, Reference No. 115 898 a/Iga, 8 pgs.
European Official Communication issued on Mar. 4, 2009 in corresponding European Patent Application 06 013 359.2.

* cited by examiner

*Primary Examiner*—M. R. Sedighian

(57) ABSTRACT

An interferometer comprises a delay element and a phase shift element. The delay element delays an optical DQPSK signal by one-symbol time. The phase shift element shifts the optical DQPSK signal by $\pi/8$. A pair of photodiodes converts each of a pair of optical signals output from the interferometer into an electric signal. A photodetector circuit converts differential current obtained by a pair of the photodiodes into voltage and outputs as a detection signal. A first decision circuit outputs one-bit information based on the voltage of the detection signal. A second decision circuit outputs one-bit information based on a squared value of the voltage of the detection signal.

19 Claims, 17 Drawing Sheets

| INPUT PHASE DIFFERENCE | 0 | π/2 | π | 3π/2 |
|---|---|---|---|---|
| PHASE DIFFERENCE AFTER PHASE SHIFT π/4 (Δφa) | π/4 | 3π/4 | 5π/4 | 7π/4 |
| PHASE DIFFERENCE AFTER PHASE SHIFT -π/4 (Δφb) | 7π/4 | π/4 | 3π/4 | 5π/4 |
| PD1003a OPTICAL CURRENT ∝ $\sin^2(\Delta\phi a/2)$ | 0.15 | 0.85 | 0.85 | 0.15 |
| PD1003b OPTICAL CURRENT ∝ $\cos^2(\Delta\phi a/2)$ | 0.85 | 0.15 | 0.15 | 0.85 |
| PD1004a OPTICAL CURRENT ∝ $\sin^2(\Delta\phi b/2)$ | 0.15 | 0.15 | 0.85 | 0.85 |
| PD1004b OPTICAL CURRENT ∝ $\cos^2(\Delta\phi b/2)$ | 0.85 | 0.85 | 0.15 | 0.15 |
| ① (PD1003b CURRENT) − (PD1003a CURRENT) → PHOTO DETECTOR CIRCUIT 1003 OUTPUT LEVEL (DECISION RESULT) | 0.7(1) | −0.7(0) | −0.7(0) | 0.7(1) |
| ② (PD1004b CURRENT) − (PD1004a CURRENT) → PHOTO DETECTOR CIRCUIT 1004 OUTPUT LEVEL (DECISION RESULT) | 0.7(1) | 0.7(1) | −0.7(0) | −0.7(0) |

FIG. 2

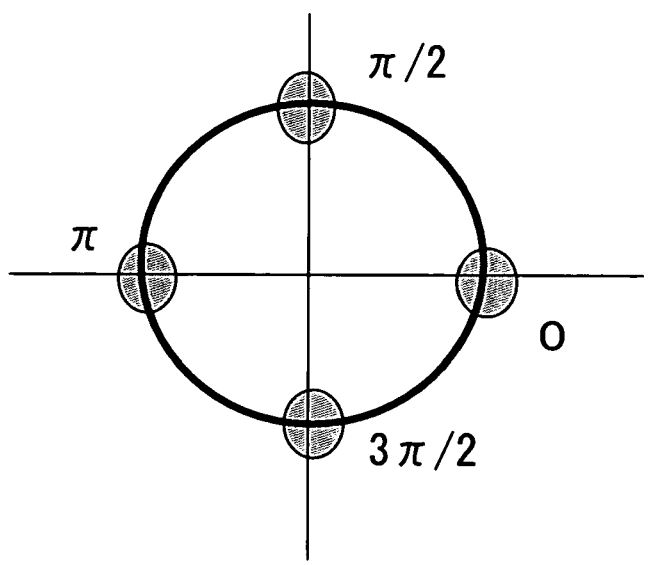
F I G. 5 A
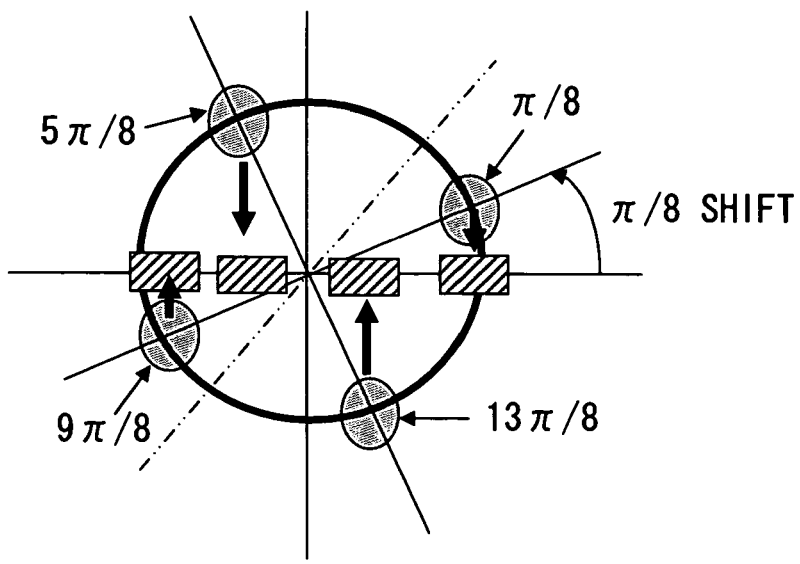
F I G. 5 B

| PHASE DIFFERENCE BETWEEN ADJACENT INPUT SYMBOLS | 0 | π/2 | π | 3π/2 | |
|---|---|---|---|---|---|
| PHASE DIFFERENCE AFTER PHASE SHIFT OF π/8 (Δφ) | π/8 | 5π/8 | 9π/8 | 13π/8 | |
| PD21 OPTICAL CURRENT ∝ Sin² (Δφ/2) | 0.038 | 0.691 | 0.962 | 0.309 | |
| PD22 OPTICAL CURRENT ∝ Cos² (Δφ/2) | 0.962 | 0.309 | 0.038 | 0.691 | |
| (PD22 CURRENT) − (PD21 CURRENT) | 0.924 | −0.382 | −0.924 | 0.382 | (+/− DECISION) |
| { (PD22 CURRENT) − (PD21 CURRENT) }² | 0.853 | 0.146 | 0.853 | 0.146 | (THRESHOLD DECISION) |

F I G. 6

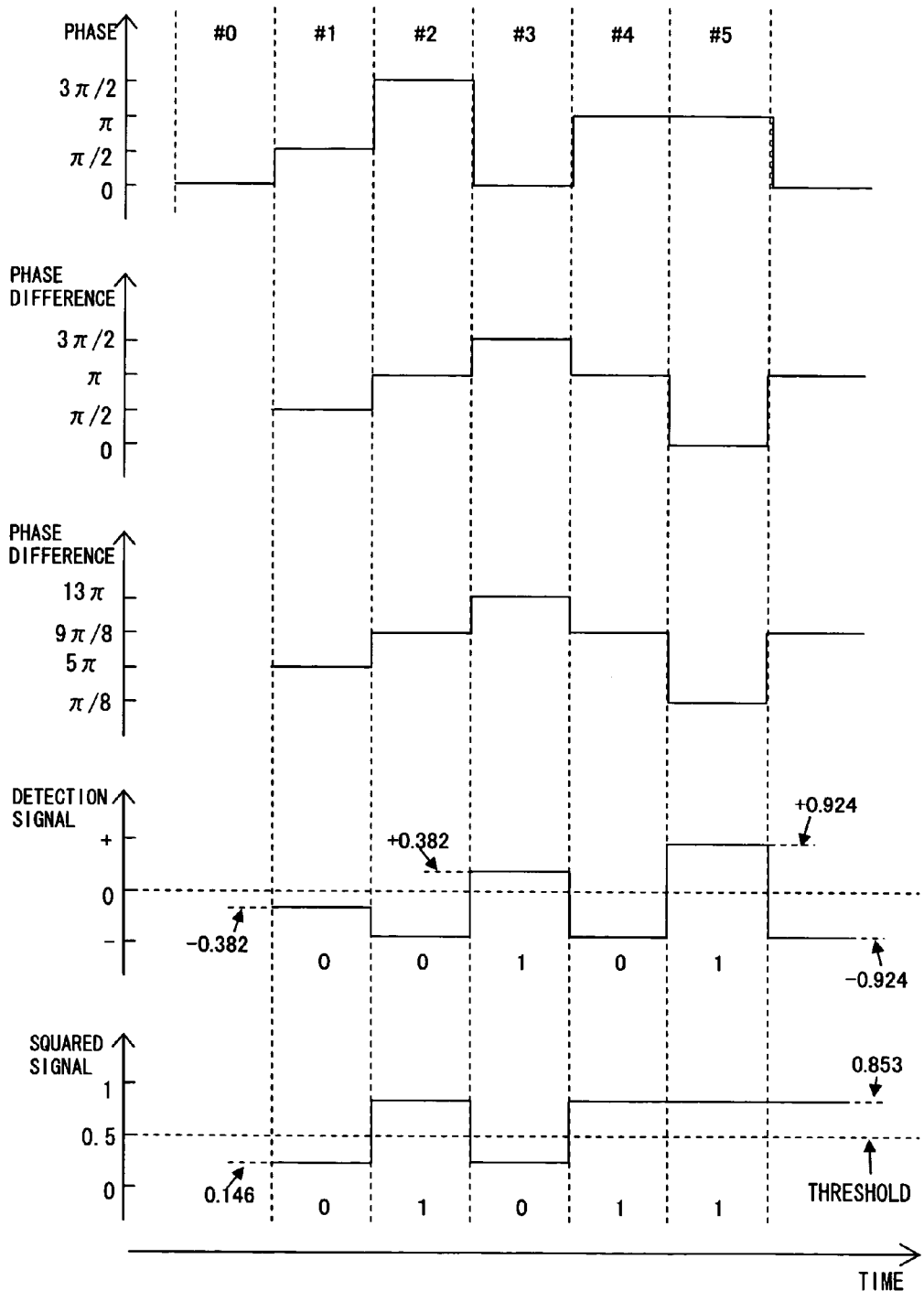
F I G. 7

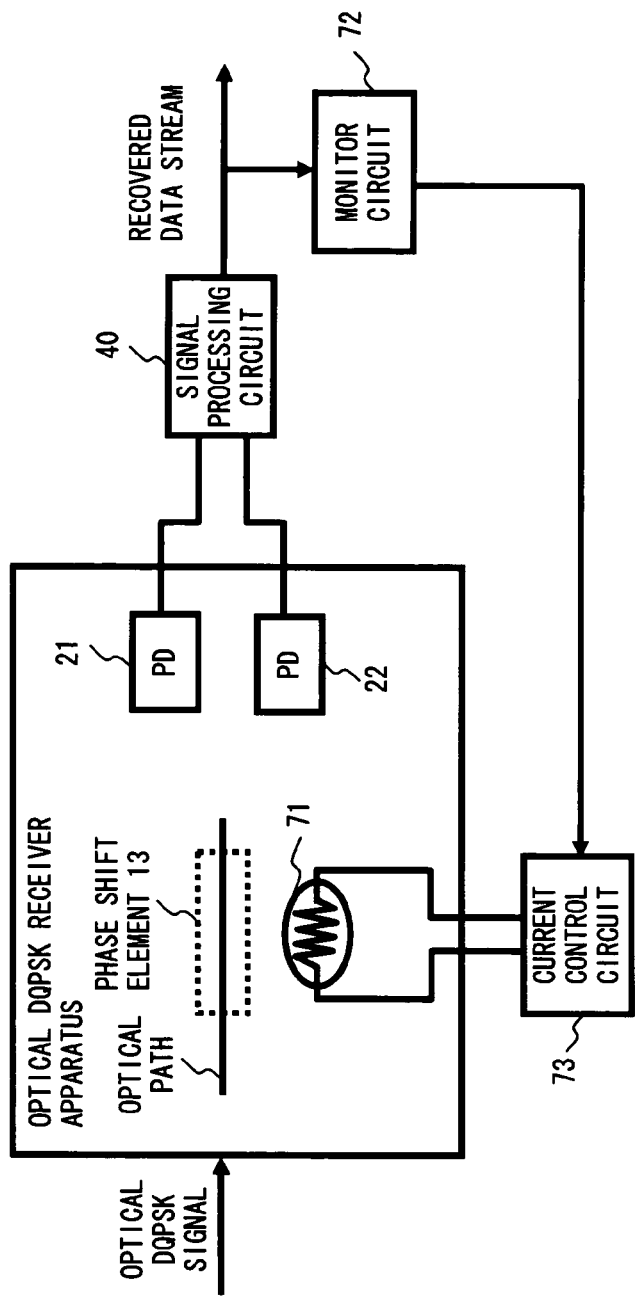
F I G. 12

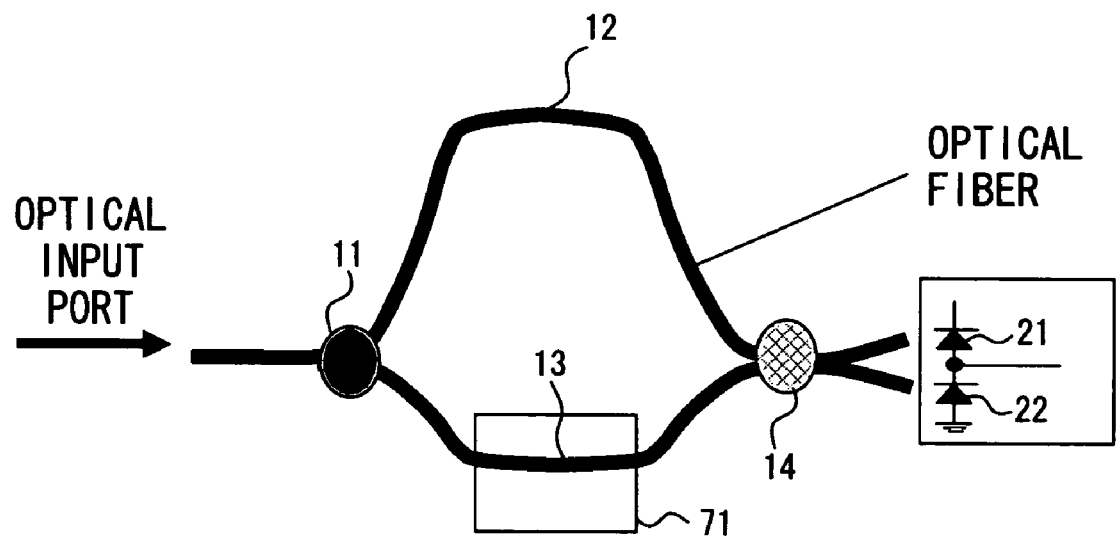
- ◉ 1×2 OPTICAL COUPLER (PROCESSED OPTICAL FIBER)
- ⊗ 2×2 OPTICAL COUPLER (PROCESSED OPTICAL FIBER)
F I G. 14

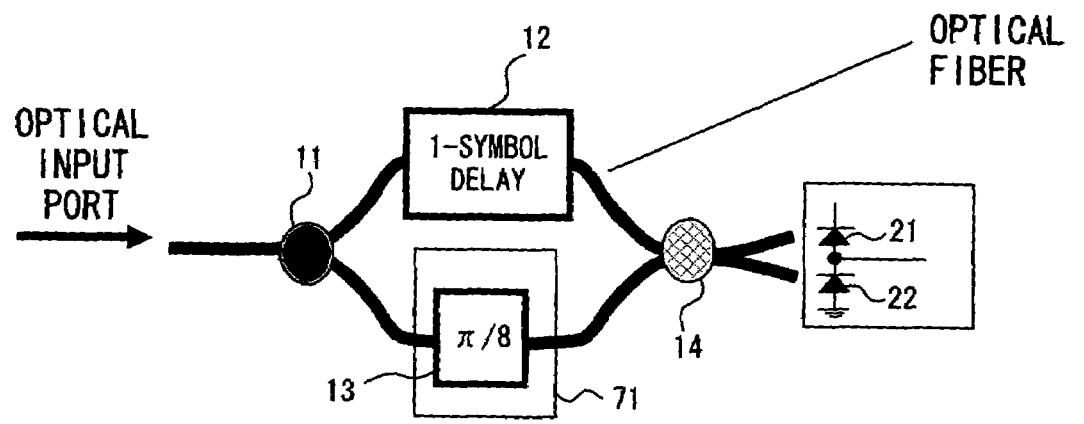
F I G. 1 5

| PHASE DIFFERENCE BETWEEN ADJACENT INPUT SYMBOLS | 0 | $\pi/2$ | $\pi$ | $3\pi/2$ |
|---|---|---|---|---|
| PHASE DIFFERENCE AFTER PHASE SHIFT $5\pi/8$ ($\Delta\phi$) | $5\pi/8$ | $9\pi/8$ | $13\pi/8$ | $\pi/8$ |
| PD21 OPTICAL CURRENT $\propto \sin^2(\Delta\phi/2)$ | 0.691 | 0.962 | 0.309 | 0.038 |
| PD22 OPTICAL CURRENT $\propto \cos^2(\Delta\phi/2)$ | 0.309 | 0.038 | 0.691 | 0.962 |
| (PD22 CURRENT) − (PD21 CURRENT) | −0.382 | −0.924 | 0.382 | 0.924 | (+/− DECISION) |
| [ (PD22 CURRENT) − (PD21 CURRENT) ]² | 0.146 | 0.853 | 0.146 | 0.853 | (THRESHOLD DECISION) |

F I G. 1 7

OPTICAL DQPSK RECEIVER APPARATUS

BACKGROUND OF THE INVENTION

1. Field of the Invention

The present invention relates to an optical receiver for receiving an optical signal modulated by M-ary ($M \geq 4$) DPSK, and specifically relates to an optical DQPSK receiver apparatus for receiving an optical signal modulated by DQPSK. The present invention is applicable to optical communications, optical signal processing, and optical measurements.

2. Description of the Related Art

Phase modulation has been in practical use as one of technologies to transmit signals in optical transmission systems. In the phase modulation, data is transmitted by shifting a phase of carrier wave in accordance with transmission data. For example, in Quadrature Phase Shift Keying (QPSK), respective "θ", "θ+π/2", "θ+π", or "θ+3π/2" is assigned to each of the corresponding symbol "00", "01", "11" or "10" comprised by 2-bit data. Here, "θ" is an arbitrary phase. The receiver equipment recovers transmitted data by detecting the phase of the received signal.

Differential Quadrature Phase Shift Keying (DQPSK) is known as a technology to improve receiver sensitivity of a QPSK receiver. In DQPSK, the amount of change in the phase of a carrier wave between two consecutive symbols ("0", "π/2", "π", or "3π/2") is associated with the 2-bit transmission information. Therefore, the receiver equipment can recover transmission data by detecting the phase difference between the adjacent two symbols. By the DQPSK modulation, increase in transmission speed and/or improvement of optical S/N ratio, which is deteriorated due to the increase in speed in the transmission path, can be achieved.

FIG. 1 is a diagram describing the configuration of an existing optical DQPSK receiver apparatus. An optical DQPSK receiver apparatus 1000 shown in FIG. 1 comprises a pair of interferometers 1001 and 1002, and an optical DQPSK signal is split by an optical splitter and guided to a pair of the interferometers 1001 and 1002. A one-symbol delay element is provided to one arm of the interferometer 1001, and a π/4 phase shift element is provided to the other arm. A one-symbol delay element is provided to one arm of the interferometer 1002, and −π/4 phase shift element is provided to the other arm. A photo detector circuit 1003 comprises a pair of photodiodes 1003a and 1003b connected in series with each other. A photo detector circuit 1004 comprises a pair of photodiodes 1004a and 1004b connected in series with each other. A pair of optical signals output from the interferometer 1001 is guided to the photodiodes 1003a and 1003b, and a pair of optical signals output from the interferometer 1002 is guided to the photodiodes 1004a and 1004b. Note that "to connect in series" refers to the state of a pair of two photodiodes connected in series when the two diodes are modeled as current sources.

Each of the photo detector circuits 1003 and 1004 outputs a difference in current generated by each of a pair of photodiodes (differential signals). The differential signals generated by the photo detector circuits 1003 and 1004 are amplified by each of preamplifiers 1005 and 1006, and are transmitted to a signal process circuit, not shown in the drawing. The signal process circuit recovers 2-bit data from these differential signals.

FIG. 2 is a diagram explaining operations of the optical DQPSK receiver apparatus shown in FIG. 1. In DQPSK, the phase difference between adjacent symbols is "0", "π/2", "π", or "3π/2". Thus, the phase difference between a pair of optical signals interfering each other in the interferometer 1001 is "π/4", "3π/4", "5π/4", or "7π/4". The phase difference between a pair of optical signals interfering each other in the interferometer 1002 is "7π/4", "π/4", "3π/4", or "5π/4". If the phase differences in the optical signals interfering with each other in the interferometers 1001 and 1002 are defined "Δφa" and "Δφb", respectively, the current generated by each photodiode is as shown in FIG. 2. In other words, if the phase difference between adjacent symbols is "0", for example, the current generated by the photodiode 1003a is "0.15". Note that the current value shown in FIG. 2 is normalized.

Each of the photo detector circuits 1003 and 1004 outputs signal representing the difference between the current generated by a pair of photodiodes. As a result, the output levels of the photo detector circuits 1003 and 1004 becomes "0.7" or "−0.7" in accordance with the phase difference between symbols adjacent to each other. Therefore, by using "threshold=0", 2-bit data corresponding to the phase difference between the symbols can be obtained. In the example of FIG. 2, for example, when the phase difference between symbols is "π/2", the output levels of the photo detector circuits 1003 and 1004 are "−0.7(<0)" and "0.7(>0)", and therefore, "0" and "1" are obtained.

The configuration and the operation of the optical DQPSK receiver apparatus are described in detail in Patent Document 1 (Published Japanese Translation of PCT patent application No. 2004-516743) and Patent Document 2 (WO 03/063515A2), for example.

In the conventional optical DQPSK receiver apparatus shown in FIG. 1, when the amount of phase shift of the phase shift element in an interferometer deviates, reception quality is degraded. For that reason, it is necessary to accurately adjust the amount of phase shift of the phase shift element all the time. However, because the amount of phase shift of the phase shift element changes due to the thermal change and aging degradation etc., the control of the amount of phase shift is complicated.

There is a requirement to reduce the size of the optical DQPSK receiver apparatus. In order to meet the requirement, it is necessary to reduce the number of the parts constituting the optical circuit (mainly interferometers and photo detector circuits).

In addition, when the optical DQPSK receiver apparatus receives high-speed data of several ten Gbps, the frequency characteristics of the photodiode constituting the photo detector circuits 1003 and 1004 have to be superior. However, such a high-speed photodiode is very expensive in general. In other words, if the number of photodiode constituting the photo detector circuit can be reduced, it is possible to keep the cost of the optical DQPSK receiver apparatus low.

SUMMARY OF THE INVENTION

It is an object of the present invention to facilitate the adjustment of the phase shift element comprised in an optical DQPSK receiver apparatus. It is another object of the present invention to reduce the size and the cost of a optical DQPSK receiver apparatus.

The optical DQPSK receiver apparatus according to the present invention comprises an optical splitter for splitting an optical DQPSK signal and for guiding the signal to a first optical path and a second optical path, a delay element provided in the first optical path, a phase shift element provided in the second optical path, for shifting the phase of an optical signal by nπ/8 (where n is an odd number), a coupler element for combining an optical signal output from the delay element and an optical signal output from the phase shift element and generating first and second optical signals, a photo detector circuit for generating a detection signal corresponding to the first and the second optical signals, and a recovery circuit for generating two-bit information based on the detection signal.

If the amount of phase shift of the phase shift element is set to nπ/8 (where n is an odd number), the power of the optical signal output from the coupler element varies in accordance with the phase difference between adjacent symbols of the optical DQPSK signal (0, π/2, π, or 3π/2). Therefore, based on the optical power, two-bit information corresponding to the phase difference between adjacent symbols can be recovered.

According to the present invention, the number of interferometers constituting an optical DQPSK receiver apparatus is reduced, facilitating the adjustment of the phase shift element and realizing the reduction in the size and the cost of the optical DQPSK receiver apparatus.

BRIEF DESCRIPTION OF THE DRAWINGS

FIG. 2 is a diagram explaining operations of the optical DQPSK receiver apparatus shown in FIG. 1;

FIGS. 5A and 5B are diagrams schematically showing operations of the optical DQPSK receiver apparatus of the embodiments;

FIG. 6 is a diagram explaining the operations of the optical DQPSK receiver apparatus of the embodiment;

FIG. 7 is a diagram showing an example of the operations of the optical DQPSK receiver apparatus of the embodiments;

FIG. 12 is a diagram explaining the adjustment of the phase shift element;

FIG. 14 to FIG. 16 are examples of other configurations of an optical circuit of the optical DQPSK receiver apparatus;

FIG. 17 is a diagram showing an example of operations of the other embodiment.

DESCRIPTION OF THE PREFERRED EMBODIMENTS

Figure 1:
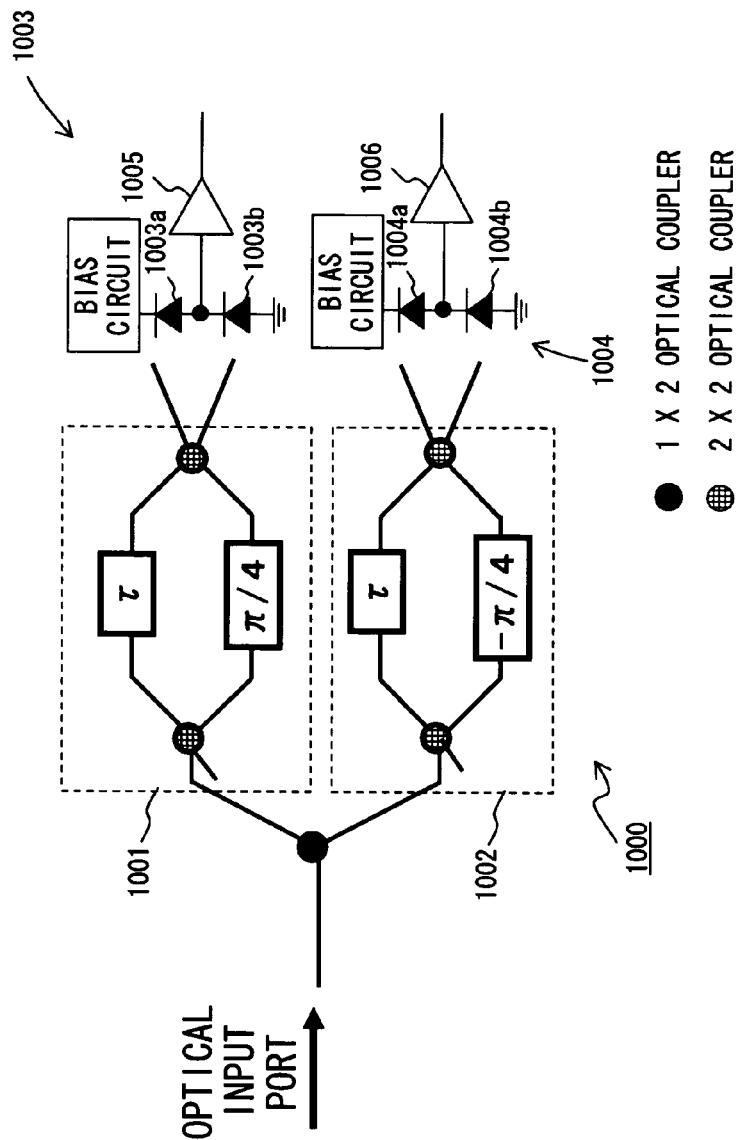
FIG. 1 is a diagram describing the configuration of an existing optical DQPSK receiver apparatus.
Figure 3:
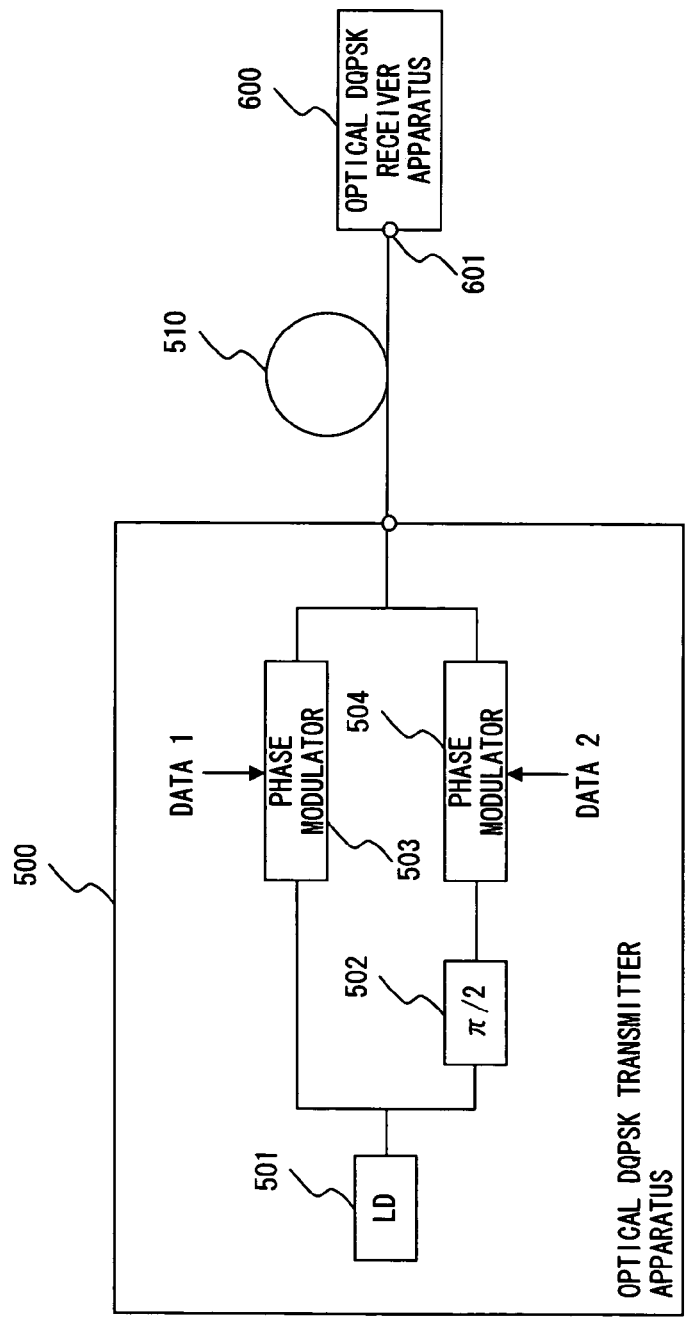
FIG. 3 is a diagram describing a configuration of an optical transmission system in which the optical DQPSK receiver apparatus of the present invention is employed.

FIG. 3 is a diagram describing a configuration of an optical transmission system in which the optical DQPSK receiver apparatus of the present invention is employed. In FIG. 3, an optical DQPSK transmitter apparatus 500 comprises an optical source (LD) 501, a π/2 phase shifter 502, and phase modulators 503 and 504. The optical source 501 generates an optical continuous wave (CW). The wavelength of the optical CW is not limited in particular; however, it is 1550 nm, for example. The π/2 phase shifter 502 provides the phase difference π/2 between a pair of optical CWs provided to the phase modulators 503 and 504. The phase modulators 503 and 504 modulate the optical CW using data 1 and data 2, respectively. Here, the data 1 and data 2 are bit streams generated by encoding transmission data by using a DQPSK pre-coder, not shown in the drawing. A pair of the optical CWs provided to the phase modulators 503 and 504 has phases different from each other by 90 degrees. For that reason, when optical signals generated from the phase modulators 503 and 504 are combined, "θ", "θ+π/2", "θ+π", or "θ+3π/2" is assigned, for example, to symbol "00", "01", "11" or "10", respectively. Then, the optical DQPSK transmitter apparatus 500 transmits the optical DQPSK signal generated in such a manner. It should be noted that the configuration of the described optical DQPSK transmitter apparatus 500 shown in FIG. 3 is just an example, and a number of other configurations can be employed. The receiver apparatus according to the present invention is applicable to any optical DQPSK transmitter apparatus, regardless of specific configurations.

The optical DQPSK signal is transmitted via an optical fiber 510, and is received by an optical DQPSK receiver apparatus 600. The optical DQPSK receiver apparatus 600 comprises an optical input port 601, and the optical DQPSK signal is guided to an optical DQPSK receiver circuit via the optical input port 601.

First Embodiment

Figure 4:
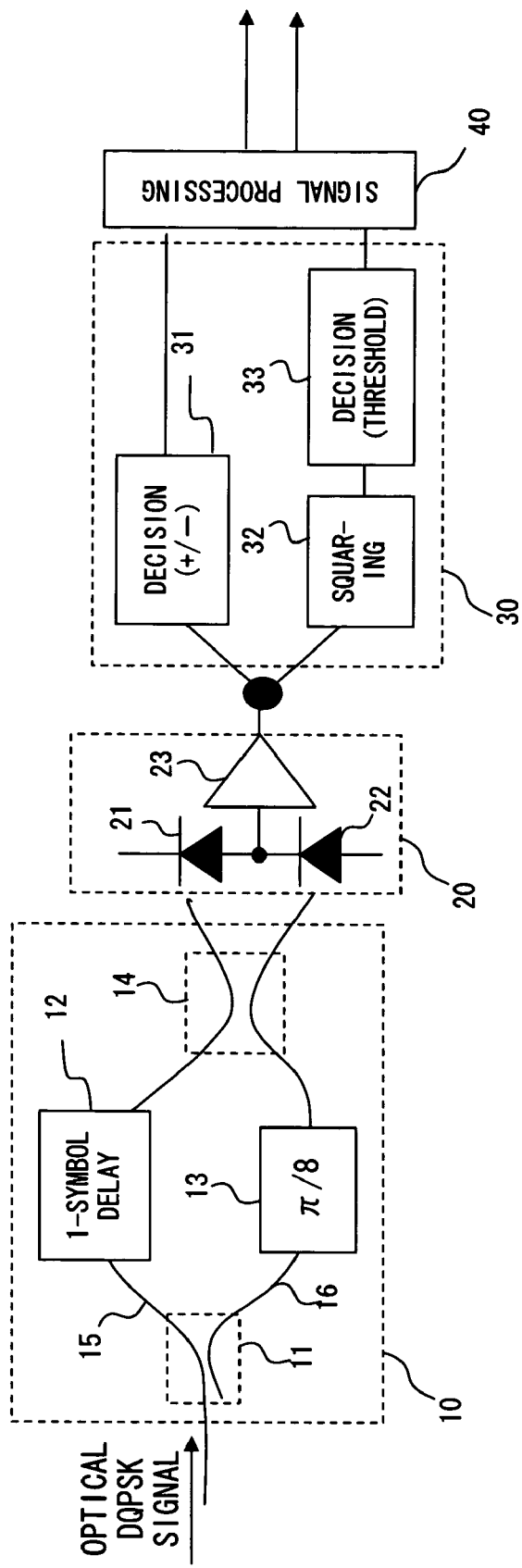
FIG. 4 is a diagram describing a configuration of the optical DQPSK receiver apparatus of the first embodiment.

FIG. 4 is a diagram describing a configuration of the optical DQPSK receiver apparatus of the first embodiment according to the present invention. This optical DQPSK receiver apparatus receives the optical DQPSK signal via the optical input port 601 shown in FIG. 3. The optical DQPSK signal is input to an interferometer 10.

The interferometer 10 is a Mach-Zehnder interferometer, for example, and comprises an optical splitter 11, a delay element 12, a phase shift element 13, and an optical coupler 14. An optical splitter 11 splits an input optical DQPSK signal and guides the split signals to an optical path 15 and an optical path 16. The splitting ratio of the optical splitter 1 is 1:1, and optical signals with equal optical power are transmitted via the optical path 15 and the optical path 16. The optical splitter 11 can be realized by a 1×2 optical coupler, for example.

The delay element 12 is provided in the optical path 15 and delays optical signals by one-symbol time. Note that in DQPSK, two bits of data is transmitted in one symbol, and therefore the 1-symbol time is equivalent to an inverse number of the transmission rate by a factor of two. The delay element 12 can be realized by having the length of the optical path 15 longer than the length of the optical path 16 by the length that an optical signal is propagated in one-symbol time, for example.

A phase shift element 13 is provided in the optical path 16, and shifts the phase of optical signals by "π/8". That is, the phase shift element 13 provides a pair of the optical signals propagated via the optical path 15 and the optical path 16 of the interferometer 10 with phase difference of π/8. In other words, the phase shift element 13 adjusts the phase of at least one of a pair of the optical signals so that the relative phase shift between the optical signals propagated via the optical path 15 and the optical path 16 of the interferometer 10 is to be π/8. Note that, the phase shift element 13 is not necessarily provided in the optical path 16, but can be provided in the optical path 15. The phase shift "π/8" provided by the phase shift element 13 should include "approximately π/8". Additionally, The phase shift "π/8" should include "π/8+2kπ (k is an integer including zero)".

An optical coupler 14 is a 2×2 optical coupler, for example, and combines the optical signal output from the delay element 12 and the optical signal output from the phase shift element 13. At that time, these optical signals interfere each other in the optical coupler 14. By this interference, a pair of complementary optical signals is output.

Note that in the embodiment shown in FIG. 4, the amount of delay in the delay element 12 is one-symbol; however, the amount of delay can be one-symbol time by a factor of any integer excluding 0, as in the configuration disclosed in Patent Document 2. The optical splitter 11 and the optical coupler 14 are not limited to a 3 dB-split directional coupler, but may be a Multimode Interference (MMI) type optical coupler, an adiabatic type optical coupler, or an X type optical coupler.

A photo detector circuit 20 comprises photodiodes 21 and 22, and a transimpedance amplifier 23, and generates a detection signal corresponding to the optical signal output from the interferometer 10. The photodiodes 21 and 22 are provided with a pair of incident optical signals output from the interferometer 10. At that time, the photodiodes 21 and 22 generate current in accordance with the power of the incident optical signal. The photodiodes 21 and 22 are connected in series with each other. In other words, the photodiodes 21 and 22 constitutes a balanced photodiode (or a twin diode) circuit. The differential current, which is the difference between the current generated by the photodiode 21 and the current generated by the photodiode 22, is provided to the transimpedance amplifier 23. At that time, if the current generated by the photodiode 22 is greater than the current generated by the photodiode 21, "positive current" is generated, and if the current generated by the photodiode 22 is less than the current generated by the photodiode 21, "negative current" is generated, for example.

The transimpedance amplifier 23 converts the differential current generated by the photodiodes 21 and 22 into voltage. The voltage signal is output to a recovery circuit 30 as a detection signal corresponding to the optical signal output from the interferometer 10. If the differential current is the "positive current", a detection signal with positive voltage is generated, and if the differential current is the "negative current", a detection signal with negative voltage is generated. It should be noted that a pair of amplifiers for converting the current generated by the photodiodes 21 and 22 into the corresponding voltages, and a subtraction circuit for generating the difference between the output voltage of a pair of the amplifiers may be provided instead of the transimpedance amplifier 23.

The recovery circuit 30 comprises a decision circuit 31, a squaring circuit 32, and a decision circuit 33, recovers two-bit information from the detection signal generated by the photo detector circuit 20. The decision circuit 31 outputs one-bit information corresponding to voltage polarity of the detection signal. For example, if the voltage of the detection signal is positive, "1" is output, and "0" is output if the voltage of the detection signal is negative. In such a case, the decision circuit 31, for example, can be realized by a comparator for comparing the voltage of the detection signal and "zero volt".

The squaring circuit 32 generates a squared signal by squaring the detection signal. Note that the squaring circuit can be realized by a multiplier (such as a Gilbert cell multiplier etc.), for example. The decision circuit 33 outputs one-bit information based on the comparison result of the squared signal and a predetermined threshold. For example, if the squared signal is greater than the threshold, "1" is output, and if the squared signal is less than the threshold, "0" is output. In such a case, the decision circuit 31 can be realized by a comparator, for example.

A signal process circuit 40 recovers two-bit transmission data from a pair of decision results obtained by the decision circuits 31 and 33. Note that the process to recover two-bit transmission data form a pair of decision results is public knowledge of the DQPSK systems.

In the following description, the outline of the operations of the optical DQPSK receiver apparatus of the embodiment is explained with reference to FIGS. 5A and 5B. The optical phase of the optical DQPSK signal is "θ", "θ+π/2", "θ+π", or "θ+3π/2", as provided above, in accordance with the propagated symbols. The delay element 12 generating the one-symbol time delay is provided to the optical path 15 of the interferometer 10. Therefore, the phase difference between the adjacent symbols is as shown in FIG. 5A, "0", "π/2", "π", or "3π/2".

However, the phase shift element 13 generating the phase shift of π/8 is provided to the optical path 16 of the interferometer 10. Therefore, the phase difference between a pair of optical signals interfering each other in the interferometer 10 (i.e. the difference between the phase of the optical signal arriving at the optical coupler 14 via the optical path 15 and the phase of the optical signal arriving at the optical coupler 14 via the optical path 16) is "π/8", "5π/8", "9π/8", or "13π/8" as shown in FIG. 5B.

The voltage of the detection signal generated by the photo detector circuit 20 depends on the power of a pair of optical signals output from the interferometer 10. The power of each optical signal output from the interferometer 10 depends on the phase difference between a pair of optical signals interfering each other in the interferometer 10. In other words, the voltage of the detection signal depends on the phase difference between a pair of optical signals interfering each other in the interferometer 10. At this point, the phase difference between a pair of optical signals interfering each other in the interferometer 10 is "π/8", "5π/8", "9π/8", or "13π/8" as shown in FIG. 5B. The voltage of the detection signal is proportional to the value obtained by projecting the signal points representing each phase difference ("π/8", "5π/8", "9π/8", or "13π/8") on an evaluation axis representing "phase difference=0", as in FIG. 5B. Note that the relation between the voltage of the detection signal and the value obtained by the above projection is explained later.

As described above, the voltage of the detection signal is determined in accordance with the phase difference between the adjacent symbols and is one of the four values different from one another. Consequently, by discriminating these four values, the phase difference between the adjacent symbols can be detected. In other words, by discriminating the voltage of the detection signal for each symbol, the transmission data can be recovered.

In the following description, details of the operations of the optical DQPSK receiver apparatus of the embodiment are set forth with reference to FIG. 6.

The interferometer 10 comprises a delay element 12 for generating one-symbol delay. In the interferometer 10, an optical signal of a symbol interferes with an optical signal of the subsequent symbol. The interferometer 10 also comprises a phase shift element 13 for generating the phase shift of π/8. Therefore, if the phase difference between the adjacent symbols is "0", the phase difference between the signals interfering each other in the interferometer 10 is "π/8". Similarly, if the phase difference between the adjacent symbols is "π/2", "π" or "3π/2", the phase difference between the optical signals interfering each other in the interferometer 10 is "5π/8", "9π/8", or "13π/8", respectively.

Assuming that the phase difference between the optical signals interfering each other in the interferometer 10 is "Δφ", the power of a first optical signal output from the interferometer 10 is proportional to $\sin^2(\Delta\phi/2)$, and the power of a second optical signal is proportional to $\cos^2(\Delta\phi/2)$. The first and the second optical signals are a pair of complementary optical signals obtained by the interferometer 10. The first optical signal is provided to the photodiode 21, and the second optical signal is provided to the photodiode 22.

The current generated by the photodiode 21 is proportional to the power of the first optical signal. When the phase difference between the adjacent symbols is "0" (i.e. the phase difference between the optical signals interfering each other is "π/8"), the current generated by the photodiode 21 is "0.038". In the same way, the phase difference between the adjacent symbols is "π/2", "π" or "3π/2" (i.e. the phase difference between the adjacent symbols is "5π/8", "9π/8", or "13π/8"), the current generated by the photodiode 21 is "0.619", "0.962", or "0.309", respectively. Note that these values are normalized value for the explanation, and are the same in the following description.

The current generated by the photodiode 22 is proportional to the power of the second optical signal. When the phase difference between the adjacent symbols is "0", the current generated by the photodiode 22 is "0.962". In the same way, the phase difference between the adjacent symbols is "π/2", "π" or "3π/2", the current generated by the photodiode 22 is "0.309", "0.038" or "0.691", respectively.

The voltage of the detection signal generated by the photo detector circuit 20 is proportional to the differential current, which is a difference between the current generated by the photodiode 21 and that of the photodiode 22. In other words, the voltage of the detection signal is proportional to "(PD22 current)–(PD21 current)". Then, when the phase difference between the adjacent symbols is "0", the voltage of the detection signal is "0.924". In the same way, when the phase difference between the adjacent symbols is "π/2", "π" or "3π/2", the voltage of the detection signal is "–0.382", "–0.924", or "0.382", respectively. Note that the description of the voltage of the detection signal uses the normalized current value.

The decision circuit 31 outputs one-bit information based on the polarity of the voltage of the detection signal. At this point, if the voltage of the detection signal is positive, "1" is output, and if it is negative, "0" is output. Consequently, the phase difference between the adjacent symbols is "0" or "3π/2", "1" is output. On the other hand, the phase difference between the adjacent symbols is "π/2" or "π", "0" is output.

The squaring circuit 32 squares the voltage of the detection signal. Therefore, the phase difference between the adjacent symbols is "0", "π/2", "π" or "3π/2", "0.853", "0.146", "0.853", or "0.146", respectively, is obtained by the squaring circuit 32.

The decision circuit 33 output one-bit information based on the squared value obtained by the squaring circuit 32. At this time, the decision circuit 33 compares the squared value with the "threshold=0.5". If the squared value is greater than the threshold, "1" is output, and if it is smaller than the threshold, "0" is output. Consequently, when the phase difference between the adjacent symbols is "0" or "π", "1" is output. Meanwhile, the phase difference between the adjacent symbols is "π/2" or "3π/2", "0" is output.

As described above, each of the decision circuits 31 and 33 outputs one-bit information. In other words, if the phase difference between the adjacent symbols is "0", "11" is output. In the same way, the phase difference between the adjacent symbols is "π/2", "π" or "3π/2", "00", "01", or "10" is output. The signal process circuit 40 recovers the two-bit transmission data by performing the DQPSK decode on the 2-bit information received form the decision circuits 31 and 33.

The differential current obtained by the photodiodes 21 and 22 is represented by the following equation.

$$\text{Differential current} \propto \cos^2(\Delta\phi/2) - \sin^2(\Delta\phi/2) = \cos(\Delta\phi)$$

In the equation, "Δφ" is "the phase difference between the adjacent symbols+π/8". Therefore, in FIG. 5B, the value proportional to the differential current can be obtained by projecting the signal point representing each of the phase differences on the evaluation axis representing "phase difference=0". That is, the phase difference between the adjacent symbols and the value on the evaluation axis obtained by the projection corresponds to 1:1.

FIG. 7 is a diagram showing an example of the operations of the optical DQPSK receiver apparatus of the embodiment. In this description, assume that the phases of the successive symbols of the optical DQPSK signals (#1, #2, #3, #4, #5, ... ) are "π/2", "3π/2", "0", "π", "π", .... In addition, assume that the phase of the 0-th symbol is "0". The decision circuit 33 uses "0.5" as the threshold.

When the 1st symbol of the optical DQPSK signal is input, two-bit information is generated as below. The difference between the phase of the 0th symbol and the phase of the 1st symbol is "π/2". Since the phase shift element 13 is provided in the optical path 16, a pair of optical signals having "5π/8" phase difference interfere each other in the interferometer 10. As a result, the voltage of the detection signal obtained by the photo detector 20 is "–0.382". In other words, negative voltage is obtained. Then the decision circuit 31 outputs "0". The squared voltage value of the detection signal is "0.146". In other words, the value smaller than the threshold is obtained. Therefore, the decision circuit 33 outputs "0". As described above, when the 1st symbol is input, two-bit information "00" is output.

Next, the 2nd symbol is input. At that time, the difference between the phase of the 1st symbol and the phase of the 2nd symbol is "π", and therefore, a pair of optical signals having "9π/8" phase difference interfere each other in the interferometer 10. As a result, the voltage of the detection signal obtained by the photo detector circuit 20 is "–0.924". In other words, negative voltage is obtained. Then the decision circuit 31 outputs "0". The squared voltage value of the detection signal is "0.853". In other words, the value larger than the threshold is obtained. Therefore, the decision circuit 33 outputs "1". As described above, when the 2nd symbol is input, two-bit information "01" is output. In the same manner, when 3rd, 4th, and 5th symbols are input, two-bit information "10", "01", and "11", respectively, is output.

Second Embodiment

Figure 8:
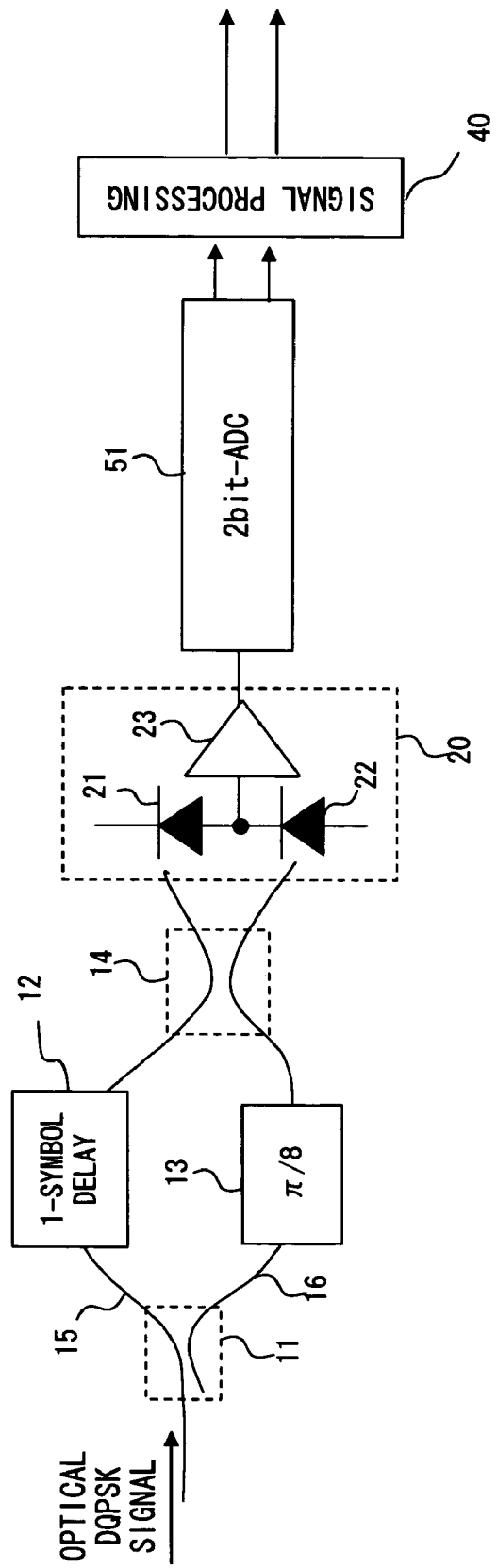
FIG. 8 is a diagram showing the configuration of the optical DQPSK receiver apparatus of the second embodiment.

FIG. 8 is a diagram showing a configuration of the optical DQPSK receiver apparatus of the second embodiment according to the present invention. The basic configuration of the optical DQPSK receiver apparatus of the second embodiment is the same as that of the optical DQPSK receiver apparatus of the first embodiment. However, the optical DQPSK receiver apparatus of the second embodiment comprises a two-bit A/D converter 51 as a recovery circuit.

The two-bit A/D converter 51 converts the voltage of the detection signal output from the transimpedance amplifier 23 into two-bit digital data. At that time, the voltage of the detection signal is the same as that of the first embodiment and is determined in accordance with the phase difference between adjacent symbols. The two-bit A/D converter 51 is set so as to be able to discriminate each voltage value. In the example shown in FIG. 6, when the phase difference between adjacent symbols is "0", "π/2", "π" or "3π/2", the voltage of the detection signal is "0.924", "−0.382", "−0.924" or "0.382". In such a case, the two-bit A/D converter 51 is set, for example, as below.

When the voltage of the detection signal is "0.5" or more: 11

When the voltage of the detection signal is "0 to 0.5": 10

When the voltage of the detection signal is "−0.5 to 0": 01

When the voltage of the detection signal is smaller than "−0.5": 00

Then, when the phase difference between adjacent symbols is "0", "π/2", "π", or "3π/2", the two-bit A/D converter 51 outputs "11", "01", "00", or "10". The correspondence between the phase difference between adjacent symbols and the generated two-bit information in the second embodiment is different from that of the first embodiment. The difference is absorbed by the signal process circuit 40, for example.

The photo detector circuit 20 shown in FIG. 8 comprises a pair of photodiodes 21 and 22; however the second embodiment is not limited to such a configuration. In other words, the two-bit A/D converter 51 can convert arbitrary four values into corresponding two-bit information by changing the setting. For example, the photodiode 21 generates different current in accordance with the phase difference between the adjacent symbols (In FIG. 6, "0.038", "0.691", "0.962", or "0.309"). Therefore, the configuration may be such that the photo detector circuit 20 uses either one of the photodiodes 21 or 22.

Third Embodiment

Figure 9:
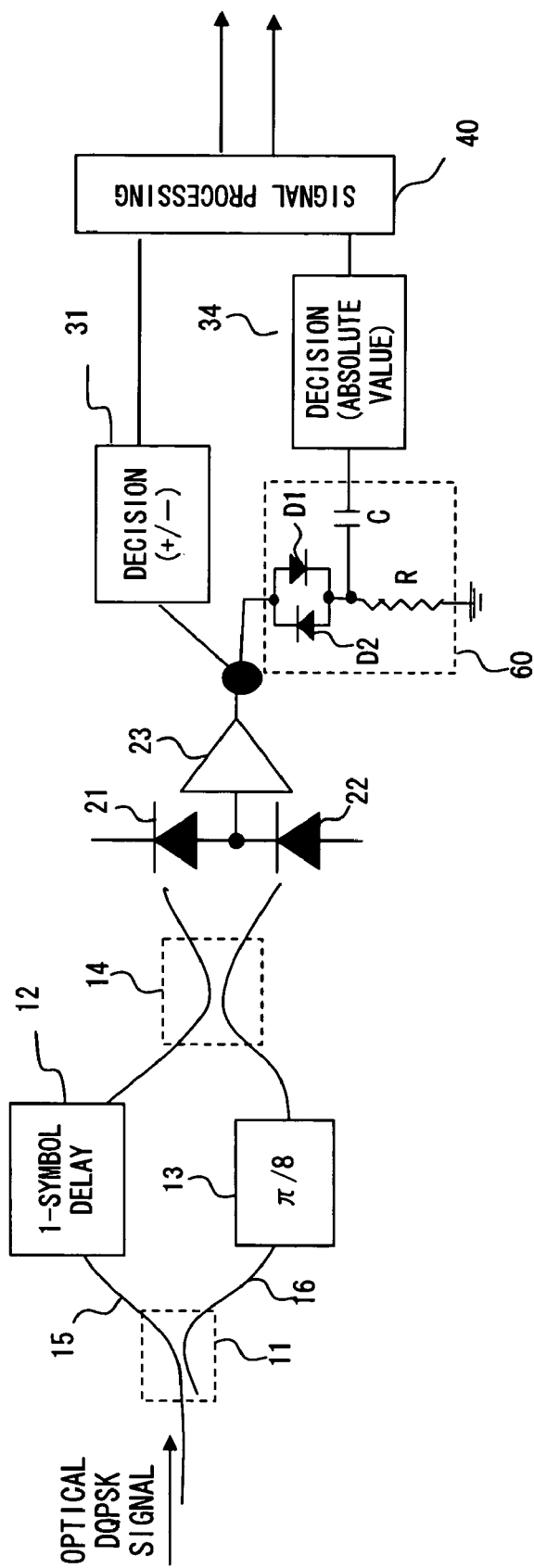
FIG. 9 is a diagram showing the configuration of the optical DQPSK receiver apparatus of the third embodiment.

FIG. 9 is a diagram showing the configuration of the optical DQPSK receiver apparatus of the third embodiment according to the present invention. The basic configuration of the optical DQPSK receiver apparatus of the third embodiment the same as the optical DQPSK receiver apparatus of the first embodiment. However, the optical DQPSK receiver apparatus of the third embodiment comprises a converter circuit 60 instead of the squaring circuit 32. The operations of the decision circuit 34 are different from those of the decision circuit 33.

The converter circuit 60 comprises diodes D1 and D2, a resistor R, and a capacitor C. The diodes D1 and D2 are connected in parallel and in an inverted orientation. The detection signal is provided to the anode of the diode D1 and the cathode of the diode D2. The cathode of the diode D1 and the anode of the diode D2 are grounded via the resistor R. The capacitor C removes the direct current component.

In the converter circuit 60 of the above configuration, if the voltage of the detection signal is higher than the pn junction voltage of the diode D1, forward current flows via the diode D1, and the positive voltage is generated in the resistor R. In the same manner, the voltage of the detection signal is negative, and the absolute value of the voltage is greater than the pn junction voltage of the diode D2, forward current flows via the diode D2, and the negative voltage is generated in the resistor R. However, if the absolute value of the voltage of the detections signal is smaller than a prescribed value (i.e. the pn junction voltage), current hardly flows in neither of the diode D1 or D2, and the voltage across the resistor R is substantially zero.

Figure 10:
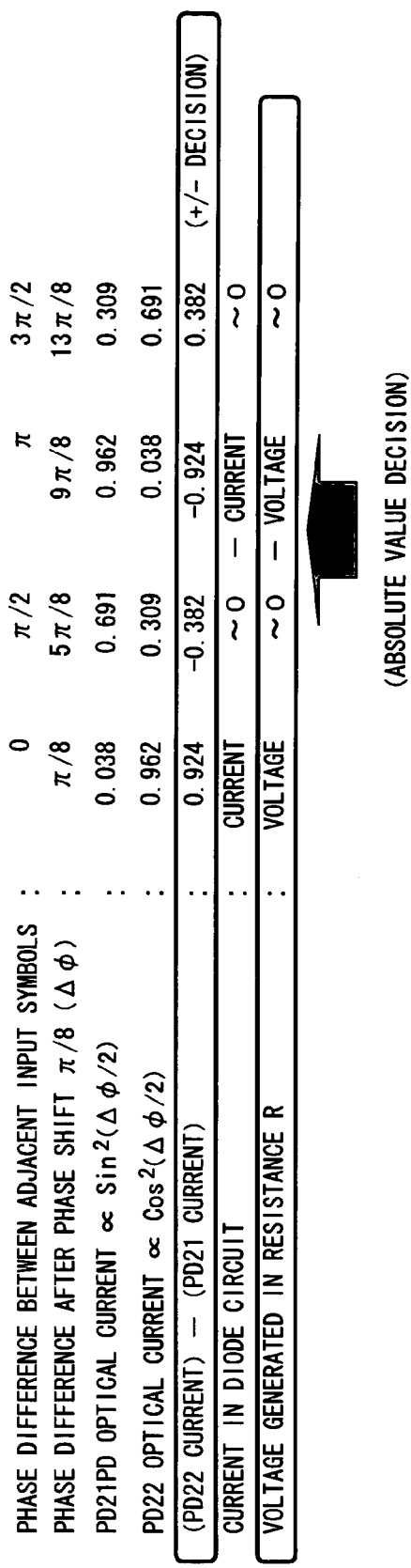
FIG. 10 is a diagram explaining operations of the optical DQPSK receiver apparatus of the third embodiment.

For example, assume that the voltage of the detection signal (i.e. differential current of the photodiodes 21 and 22) is "0.924", "−0.382", "−0.924" or "0.382" as shown in FIG. 10. In addition, assume the pn junction voltage of each of the diodes D1 and D2 is "0.5". In such a case, the phase difference between adjacent symbols is "0", the current flows via the diodes D1, and the "positive voltage" is generated in the resistor R. If the phase difference between adjacent symbols is "π", the current flows via the diodes D2, and the "negative voltage" is generated in the resistor R. Meanwhile, the phase difference between adjacent symbols is "π/2", or "3π/2", the current does not flow in the diodes D1 and D2, and the voltage across the resistor R is substantially zero.

Figure 11:
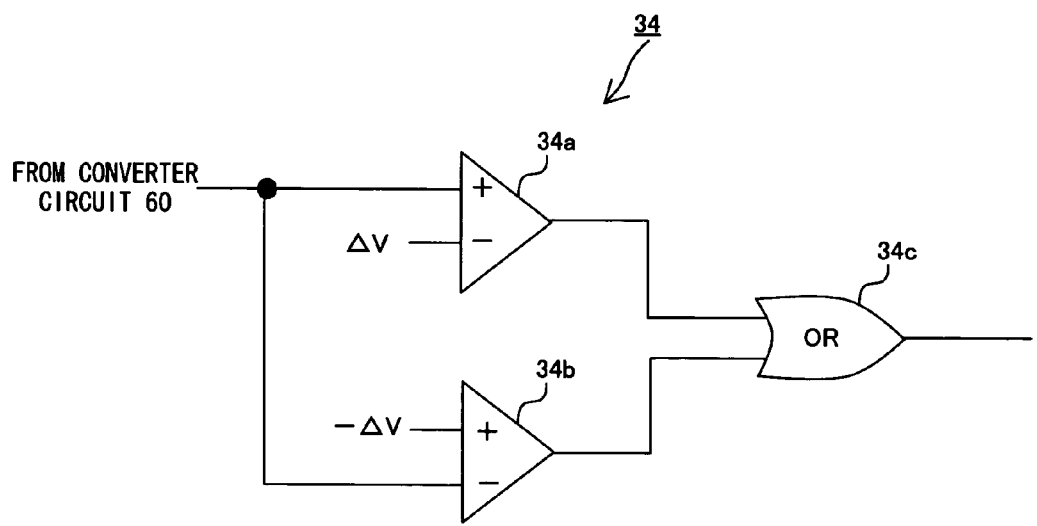
FIG. 11 is an example of a decision circuit used in the third embodiment.

The decision circuit 34 generates corresponding one-bit information based on the absolute value of the voltage generated in the resistor R. At that time, the decision circuit 34, for example, comprises comparators 34a and 34b, and an OR circuit 34c as shown in FIG. 11. The comparator 34a outputs "1" when the voltage across the resistor R is higher than ΔV. The comparator 34b outputs "1" when the voltage across the resistor R is lower than −ΔV. Note that ΔV is significantly small positive voltage.

The decision circuit 34 of the above configuration outputs "1" when the phase difference between adjacent symbols is "0" or "π", and outputs "0" when the phase difference between adjacent symbols is "π/2" or "3π/2". In other words, the converter circuit 60 and the decision circuit 34 provide the function substantially the same as the squaring circuit 32 and the decision circuit 33 of the first embodiment.

<Adjustment of the Phase Shift Element>

In the above embodiment, the phase shift element 13 is configured as a part of an optical path (such as an optical waveguide or an optical fiber), for example. The amount of phase shift of the phase shift element 13 can be adjusted by changing the optical path length of the optical path.

FIG. 12 is a diagram explaining the adjustment of the phase shift element. This drawing shows a feedback system for adjusting an optical path length of the phase shift element by using thermal change. In such a case, an adjustment element 71 is, for example, a heater generating heat by applying the current to a resistance. The adjustment element 71 is arranged in proximity to the phase shift element 13. A monitor circuit 72 monitors bit error rate of data stream output from the signal process circuit 40. At this point, if the optical path length (i.e. the amount of phase shift) of the phase shift element 13 is appropriately adjusted, the error rate should be low. Thus, the monitor circuit 72 generates a command to lower the bit error rate of the recovered data stream. A current control circuit 73 controls current passing through the adjustment element 71 according to the command from the monitor circuit 72. By so doing, the optical path length of each phase shift element is optimized, and bit error rate of the recovered data steam is reduced. It should be noted that a control system for adjusting the phase shift element 13 is practically useful; however, it is not required configuration for implementation of the present invention.

The adjustment element 71 is able to adjust the optical path length of the corresponding optical path by utilizing the thermal change in the volume and the refractive index of the optical path medium. In such a case, the adjustment element 71 can be realized by, for example, a heater using electrical resistance, a Peltier element, or a light irradiating element. The adjustment element 71 may adjust the optical path length of the corresponding optical path by using refractive index change with respect to the electro-optical effect or change of electron density in the semiconductor material. In such a case, the adjustment element 71 is, for example, realized by a circuit for adjusting the refractive index of the corresponding optical path by using the electro-optical effect.

<Other Configuration>

Figure 13:
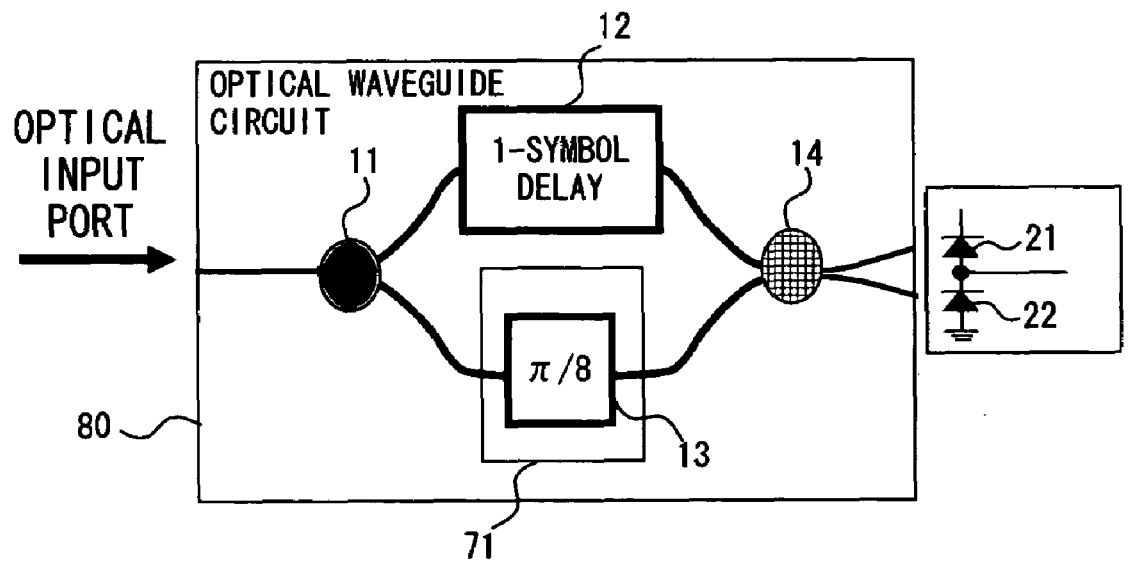
FIG. 13 is a diagram showing the configuration employing a two-dimensional optical waveguide circuit.

The optical circuits (such as the optical splitter 11, the delay element 12, the phase shift element 13, the optical coupler 14, the optical paths 15 and 16) of the optical DQPSK receiver apparatus of the first through the third embodiments described above can be implemented by a two-dimensional optical waveguide circuit as shown in FIG. 13. In this case, the two-dimensional optical waveguide circuit 80 is formed on the surface of approximate plane of the optical waveguide substrate. The adjustment element 71 explained with reference to FIG. 12 is formed on the two-dimensional optical waveguide circuit 80. It should be noted that the size of the receiver apparatus can be reduced by realizing the optical circuits with the two-dimensional optical waveguide circuit.

The above two-dimensional optical waveguide circuit includes a configuration such that on a substrate on a plane such as quartz or silicon crystal with the rate of heat expansion being low and the asperity being infinitesimal, the core and clad of the optical waveguide is made from quartz glass material etc., and create a precise waveguide pattern is created by a technology such as photolithography. Note that it is possible to create the core and clad using resin material or semiconducting material etc. besides the quartz glass material. In addition, the optical waveguide other than the optical splitter and the optical coupler is a single mode waveguide in general.

Furthermore, the two-dimensional optical waveguide circuit includes a configuration such that a waveguide is formed by the impurity diffusion of Ti etc. or the ridge patterning etc. on a crystalline substrate such as Lithium Niobate ($LiNbO_3$) having an electro-optical effect, and a configuration such that a waveguide is formed by a compound semiconducting material on a semiconducting crystalline substrate such as InP. In these cases, the optical waveguide other than the optical splitter and the optical coupler is a single mode waveguide in general.

Figure 16:
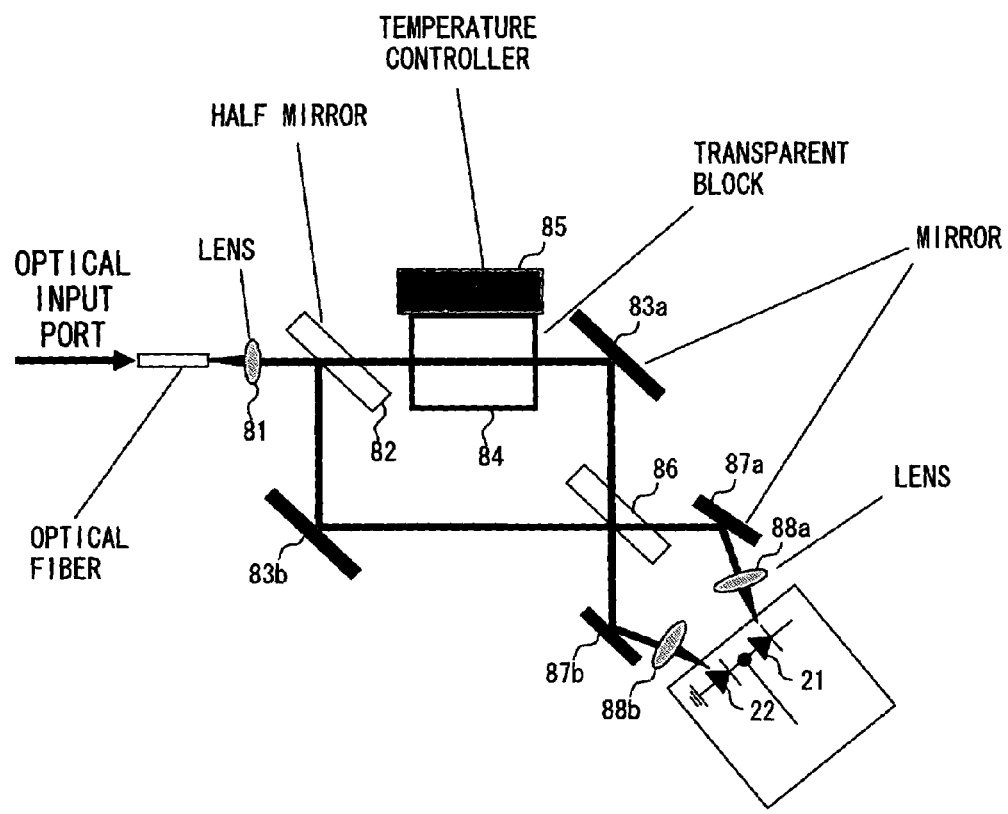

FIG. 14-FIG. 16 are diagrams showing other examples of configurations of the optical circuits (such as the optical splitter 11, the delay element 12, the phase shift element 13, the optical coupler 14, and the optical paths 15 and 16) of the optical DQPSK receiver apparatus. In the configuration shown in FIG. 14, the optical splitter 11, the delay element 12, the phase shift element 13, and the optical coupler 14 are configured by the components made by processing an optical fiber. Each of the elements is connected by optical fibers. Each of the delay element 12 and the phase shift element 13 is realized by an appropriate adjustment of an optical fiber length.

In the configuration shown in FIG. 15, each of the optical splitter 11, the delay element 12, the phase shift element 13, and the optical coupler 14 is connected by optical fibers. In other words, the optical paths 15 and 16 are realized by optical fibers.

In the configuration shown in FIG. 16, the optical splitter 11, the delay element 12, the phase shift element 13 and the optical coupler 14 are connected by a free-space optical system. In other words, the optical paths 15 and 16 are realized by the free-spatial transmission. In FIG. 16, an input optical signal is guided to a half mirror 82 via a lens 81. The half mirror 82 splits the input optical signal and directs one of the split signal to a mirror 83a and another to a mirror 83b. Between the half mirror 82 and the mirror 83a provided is a delay/phase shift element 84. The delay/phase shift element 84 is a transparent block formed by material such as glass with the refractive index being greater than 1, and delays the optical signal by one-symbol time while shifting the phase by $-\pi/8$. The amount of phase shift in the delay/phase shift element 84 is adjusted by a temperature controller 85. A coupler 86 is a half mirror, for example, and causes the light reflected by the mirror 83a and the light reflected by the mirror 83b interfere each other. A pair of the optical signals obtained by the coupler 86 is reflected by a mirror 87a and a mirror 87b, and is directed to the photodiodes 21 and 22 via the lenses 88a and 88b. In the above configuration, the half mirror 82 corresponds to the optical splitter 11. The delay/phase shift element 84 corresponds to the delay element 12 and the phase shift element 13. In addition, the coupler 86 corresponds to the optical coupler 14.

In the above first through third embodiments, the amount of phase shift of the phase shift element 13 is $\pi/8$; however, the present invention is not limited to this amount. For example, if the amount of phase shift of the phase shift element 13 is $5\pi/8$, the optical DQPSK receiver apparatus of the embodiment operates as shown in FIG. 17. In other words, in such a case, if the phase difference between adjacent symbols is "0", "$\pi/2$", "$\pi$" or "$3\pi/2$", the phase difference between a pair of the optical signals interfering each other is "$5\pi/8$", "$9\pi/8$", "$13\pi/8$", or "$\pi/8$", respectively. Then, when the phase difference between adjacent symbols is "0", the differential current is "$-0.382(<0)$" and the squared value is "0.146 (<threshold)", and the recovery circuit 30 outputs "00". In the same way, the phase difference between adjacent symbols is "$\pi/2$", "$\pi$", or "$3\pi/2$", the recovery circuit 30 outputs "01", "10", or "11", respectively. In such a manner, even if the amount of phase shift of the phase shift element 13 is $5\pi/8$, two-bit information corresponding to the phase difference between adjacent symbols can be obtained. Note that the output of the recovery circuit 30 is different between where the amount of phase shift is $\pi/8$ and where it is $5\pi/8$; however, the difference can be absorbed by the signal process circuit 40.

In the same way, the amount of phase shift of the phase shift element 13 may be $9\pi/8$ or $13\pi/8$. In addition, if the amount of phase shift of the phase shift element 13 is $3\pi/8$, $7\pi/8$, $11\pi/8$, or $15\pi/8$, the four values different from one another in accordance with the phase difference between adjacent symbols can be generated. In other words, by setting the amount of phase shift of the phase shift element 13 at "$n\pi/8$ (where n is an odd number)" the transmission data can be recovered from the optical DQPSK signal.

Moreover, the present invention is applicable not only to the DQPSK system, but also to M-ary DPSK. Here, "M" is an integer, which is an even number of 4 or greater. In such a case, the amount of phase shift of the phase shift element 13 should be set to "$m\pi/2M$ (where m is an odd number)". As the recovery circuit, a Y-bit A/D converter, for example, may be used. Here, $Y=\log_2 M$ is given.

As described above, according to the present invention, only one interferometer is required in an optical DQPSK receiver apparatus although two interferometers are provided in a conventional optical DQPSK receiver apparatus. Here the phase shift element of the interferometer can be realized by adjusting the length of the optical path in submicron range. In other words, the control to adjust the amount of phase shift of the phase shift element to an appropriate value involves difficulty. For that reason, reduction in the number of interferometers contributes to reduce the size of the receiver apparatus and facilitates the control for adjusting the amount of phase shift.

In addition, if the number of interferometers is reduced, the number of photo detectors for converting an optical signal output from the interferometer into an electrical signal can be reduced as well. Here, in order to recover the high-speed data of a several ten Gbps, the use of expensive photo detectors is required. Therefore, the configuration of the present invention contributes the cost reduction of the photo detectors.

What is claimed is:

1. An optical DQPSK receiver apparatus, comprising:
   an optical splitter for splitting an optical DQPSK signal and for guiding the signal to a first optical path and a second optical path;
   a delay element provided in the first optical path;
   a phase shift element provided in the second optical path, for shifting the phase of an optical signal by $n\pi/8$ (where n is an odd number);
   a coupler element for combining an optical signal output from said delay element and an optical signal output from said phase shift element and generating first and second optical signals;
   a photo detector circuit for generating a detection signal corresponding to the first and the second optical signals; and
   a recovery circuit for generating two-bit information based on the detection signal,
   wherein
   said recovery circuit comprises:
   a first decision unit for outputting one-bit information based on the detection signal; and
   a second decision unit for outputting one-bit information based on a squared value of the detection signal.

2. The optical DQPSK receiver apparatus according to claim 1, wherein
   said delay element delays the optical signal by about one-symbol time.

3. The optical DQPSK receiver apparatus according to claim 1, wherein
   said photo detector circuit comprises:
   first and second photodiodes on which the first and the second optical signals are respectively incident; and
   a converter circuit for generating the detection signal based on a difference between currents generated by the first and the second photodiodes.

4. The optical DQPSK receiver apparatus according to claim 3, wherein
   said converter circuit is a transimpedance amplifier.

5. The optical DQPSK receiver apparatus according to claim 3 wherein
   said recovery circuit is an A/D converter for converting the detection signal into two-bit data.

6. The optical DQPSK receiver apparatus according to claim 1, wherein
   said first decision unit outputs one-bit information based on the comparison of the detection signal with a first threshold.

7. The optical DQPSK receiver apparatus according to claim 1, wherein
   said first decision unit outputs one-bit information based on the polarity of the detection signal.

8. The optical DQPSK receiver apparatus according to claim 1, further comprising a squaring circuit for squaring the detection signal, wherein
   said second decision unit output 1-bit information based on the comparison of a squared value of the detection signal obtained by said squaring circuit with a second threshold.

9. An optical DQPSK receiver apparatus according to claim 1, wherein
   said recovery circuit comprises:
   a first decision unit for outputting 1-bit information based on the detection signal;
   a first diode, a cathode of which is provided with the detection signal;
   a second diode connected to the first diode, and an anode of which is provided with the detection signal;
   a resistor connected to an anode of said first diode and a cathode of said second diode;
   a second decision unit for outputting one-bit information based on the comparison of voltage across said resistor with a prescribed threshold.

10. The optical DQPSK receiver apparatus according to claim 1, further comprises an adjustment unit for adjusting an optical path length of the second optical path so that an amount of phase shift of the phase shift element is maintained at $n\pi/8$ (where n is an odd number).

11. The optical DQPSK receiver apparatus according to claim 10, wherein
    said adjustment unit adjusts the optical path length of the second optical path by using change in volume or refractive index due to thermal change.

12. The optical DQPSK receiver apparatus according to claim 10, wherein
    said adjustment unit adjusts the optical path length of the second optical path by using change in refractive index caused by an electro-optical effect.

13. The optical DQPSK receiver apparatus according to claim 1, wherein
    the optical splitter, the delay element, the phase shift element, and the coupler element are configured by two-dimensional optical waveguide circuit.

14. The optical DQPSK receiver apparatus according to claim 1, wherein
    the optical splitter, the delay element, the phase shift element, and the coupler element are configured by a component made by processing an optical fiber, and each of the elements are connected by an optical fiber.

15. The optical DQPSK receiver apparatus according to claim 1, wherein
    the optical splitter, the delay element, the phase shift element, and the coupler element are connected by an optical fiber.

16. The optical DQPSK receiver apparatus according to claim 1, wherein
    the optical splitter, the delay element, the phase shift element, the coupler element, are connected by a free-space optical system.

17. An optical DQPSK receiver apparatus, comprising:
    an optical splitter for splitting an optical DQPSK signal and for guiding the signal to a first optical path and a second optical path;
    a delay element provided in the first optical path;
    a phase shift element provided in the second optical path, for shifting the phase of an optical signal by $n\pi/8$ (where n is an odd number);
    a coupler element for combining an optical signal output from said delay element and an optical signal output from said phase shift element and generating a pair of complementary optical signals;
    a photo detector circuit for generating a detection signal corresponding to one of a pair of the complementary optical signals; and
    a recovery circuit for generating two-bit information based on the detection signal,
    wherein
    said recovery circuit comprises:
    a first decision unit for outputting one-bit information based on the detection signal; and a second decision unit for outputting one-bit information based on a squared value of the detection signal.

18. An optical DQPSK receiver apparatus comprising:

an interferometer having an optical splitter for splitting an optical DQPSK signal and for guiding the signal to a first optical path and a second optical path, a one-symbol delay element provided in the first optical path, a phase shift element for proving a phase difference of $n\pi/8$ (where n is an odd number) between the first and the second paths, a coupler element for combining optical signals propagated via the first and second optical paths and generating a pair of complementary optical signals;

a photo detector circuit for generating a detection signal corresponding to a pair of optical signals output from said interferometer; and a recovery circuit for generating two-bit information based on the detection signal, wherein said recovery circuit comprises:

a first decision unit for outputting one-bit information based on the detection signal; and a second decision unit for outputting one-bit information based on a squared value of the detection signal.

19. An optical M-ary DPSK receiver apparatus comprising:

an optical splitter for splitting an optical M-ary DPSK signal ($M \geq 4$) and for guiding the signal to a first optical path and a second optical path;

a delay element provided in the first optical path;

a phase shift element provided in the second optical path, for shifting the phase of an optical signal by $n\pi/2M$ (where n is an odd number);

a coupler element for combining an optical signal output from said delay element and an optical signal output from said phase shift element and generating a pair of optical signals;

a photo detector circuit for generating a detection signal corresponding to a pair of the optical signals; and a recovery circuit for generating $\log_2 M$-bit information based on the detection signal, wherein said recovery circuit comprises:

a first decision unit for outputting one-bit information based on the detection signal; and a second decision unit for outputting one-bit information based on a squared value of the detection signal.

* * * * *